United States Patent [19]
Zygiel, deceased et al.

[11] 4,181,242
[45] Jan. 1, 1980

[54] METHOD AND APPARATUS FOR DISPENSING A BEVERAGE

[75] Inventors: Alfred E. Zygiel, deceased, late of Dallas, Tex.; by Mary E. Zygiel, executrix, Port Orange, Fla.

[73] Assignee: The Cornelius Company, Anoka, Minn.

[21] Appl. No.: 871,303

[22] Filed: May 30, 1978

[51] Int. Cl.$^2$ .......... B67D 5/56; G01F 11/08

[52] U.S. Cl. .......... 222/1; 222/129.2; 222/373

[58] Field of Search .......... 222/129.2, 133, 334, 222/373, 386.5, 209, 207, 1; 137/564.5, 101.11

[56] References Cited

U.S. PATENT DOCUMENTS

| | | | |
|---|---|---|---|
| 2,585,172 | 2/1952 | Reynolds | 222/129.2 X |
| 2,748,982 | 6/1956 | Copping | 222/133 X |
| 3,884,391 | 5/1975 | Pauliukonis | 222/129.4 |

FOREIGN PATENT DOCUMENTS

| | | | |
|---|---|---|---|
| 604479 | 7/1948 | United Kingdom | 222/133 |

*Primary Examiner*—F. J. Bartuska
*Attorney, Agent, or Firm*—Henry C. Kovar

[57] ABSTRACT

Apparatus for mixing and dispensing a beverage has a mixing head, a water line having a partially restricted outlet for backing up water pressure, a concentrate chamber having a diaphragm, a bypass line from the water line to the chamber for bypassing water from the water line against the diaphragm and forcing concentrate to the mixing head, and an open drain in the bypass line for exhausting water from the concentrate chamber; also disclosed is a method of mixing and dispensing a beverage in which pressurized water is first used to propel concentrate and then exhausted out a drain.

2 Claims, 1 Drawing Figure

METHOD AND APPARATUS FOR DISPENSING A BEVERAGE

BACKGROUND OF THE INVENTION

1. FIELD OF THE INVENTION

Figure 1:
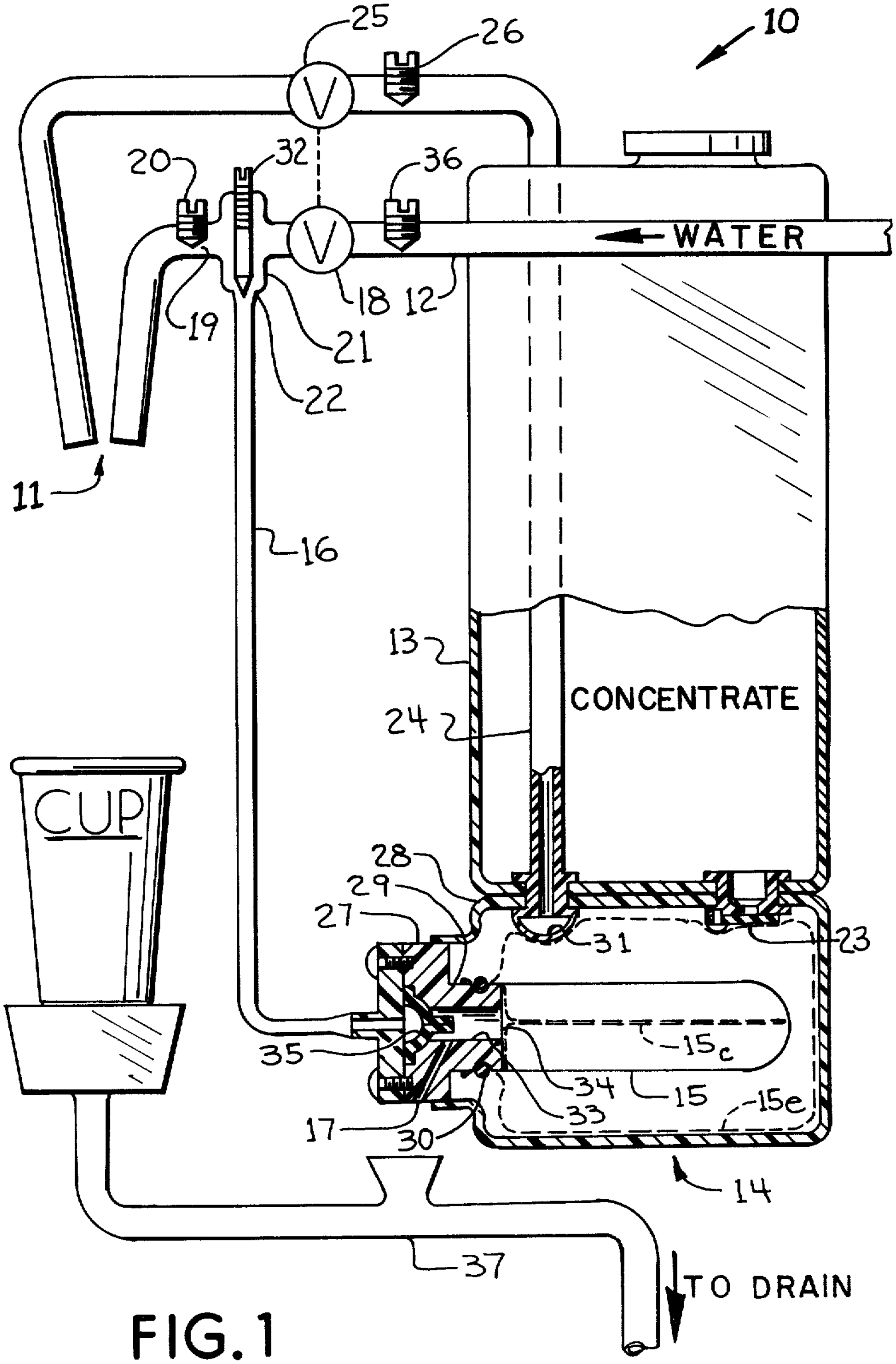

This invention pertains to apparatus and a method of dispensing a beverage in which pressurized water is used to propel beverage concentrate and is also exhausted to a drain.

2. PRIOR ART

The prior art devices include the apparatus and method disclosed in U.S. Pat. No. 3,779,261. Further examples of the prior art are B. G. Copping U.S. Pat. No. 2,495,210; E. S. Wegman U.S. Pat. No. 2,502,610 and N. L. Luster U.S. Pat. No. 2,538,111. All of these examples of the prior art disclose beverage dispensers which utilize the energy available in and from pressurized water to propel beverage concentrate to a mixing head.

For example, in the dispensing of carbonated beverages it is common to use and mix 5 parts of water and 1 part of syrup by volume to form a finished palatable beverage. In these prior devices, 1 part of water is bypassed or backed up to displace and propel 1 equal quantity of concentrate from a water actuated metering chamber or pump to a mixing head. As will be appreciated, when a cup is filled with beverage, the dispenser operator closes the dispensing valve or valves and terminates dispensing.

The problem then presented is what to do with or how to dispose of the 1 part of propellent water that is left in the concentrate chamber. The given examples of the prior art all dribble the water out the dispensing head or mixing head after the drink is dispensed and during this dribbling of water, the concentrate chamber is refilled with concentrate for the next dispensing cycle.

This problem was recognized by B. G. Copping and his solution is disclosed in his U.S. Pat. No. 2,748,982. Copping provides a solution for post or after-dispensing dribble of propellent water from a dispensing apparatus such as that in his earlier U.S. Pat. No. 2,495,210.

Copping's solution is to remove the simple and single element on-off dispensing control valve in the pressurized water line and to install a triple element valve of the stacked poppet type where there is a central shaft and three poppet valves one on top of each other. Of these three poppet valves, two are normally closed and one is normally open. The pressurized water line outlet is normally closed and a water line to the mixing head is normally closed; a water drain line from a concentrate chamber to a drip tray or waste line is normally open. A separate single element normally closed valve is provided for Copping's concentrate outlet and is connected to yet another valve which opens the outlet for dispensing of mixed water and concentrate.

The gist of Copping's solution in U.S. Pat. No. 2,748,982 is that he provides a normally open outlet from a bypass line to a drain for exhausting used water from the syrup pump and he manually closes a water exhaust valve in combination with opening of water inlet and concentrate outlet valves, to pressurize a concentrate chamber and effect simultaneous dispensing of water and concentrate.

The apparatus and sequential operation of the device of U.S. Pat. No. 2,748,982 will, upon review of the patent, be realized as being costly, complicated and having many co-functional components needing to be correctly operatively synchronized together for proper operation as intended by Copping. Further, the device does not lend itself to a multiple flavor dispenser of beverages.

SUMMARY OF THE INVENTION

In accordance with this invention, an apparatus for mixing and dispensing a beverage is provided having a mixing head, a water line connected to the mixing head and having a water dispensing control valve and a partially obstructed outlet for backing up water pressure, a concentrate chamber having a diaphragm therein and an outlet to the mixing head, a bypass line from the water line to the concentrate chamber for transferring water under backed up pressure against the diaphragm for forcing concentrate to the mixing head, and an open drain for exhausting bypassed water from the bypass line during and after dispensing; a method is also provided in accordance with this invention in which bypassed pressurized water used for propelling and dispensing beverage concentrate is exhausted to a waste drain during and after dispensing at a controlled rate which is sufficient to maintain a bypass pressure during the dispensing of beverage.

Accordingly, it is an object of the present invention to provide apparatus for mixing and dispensing a beverage, using water for propelling concentrate and having a drain for exhausting used propellent water.

It is an object of the present invention to provide apparatus for mixing and dispensing a beverage having a water pressure powered concentrate pump with a water drain of an extremely simple, reliable and low-cost configuration.

It is a further object of the present invention to provide apparatus for mixing and dispensing a beverage, having a water powered concentrate pump which does not drain propellent water from a dispensing head.

It is still a further object of the present invention to provide a method of dispensing a beverage using water for pumping concentrate and draining the water used for pumping power directly to a waste line.

Many other advantages, features and additional objects of the present invention will become manifest to those versed in the art upon making reference to the detailed description and the accompanying sheet of drawing in which a preferred structural embodiment incorporating the principles of the present invention is shown by way of illustrative example.

ON THE DRAWING

The drawing is a schematic drawing of apparatus for mixing and dispensing a beverage, provided in accordance with the principles of the present invention, and for practice of the method of dispensing a beverage in accordance with the present invention.

AS SHOWN ON THE DRAWING

The principles of the present invention are particularly useful when embodied in a beverage dispenser of the type illustrated in FIG. 1 and generally indicated by the numeral 10.

The dispenser 10 includes a dispensing or mixing head 11, a water line 12, a concentrate reservoir 13, a concentrate metering chamber 14, a diaphragm 15 in the metering chamber 14, a bypass line 16 connecting the water line 12 to the metering chamber 14 and a drain 17 in the bypass line 16.

The water line 12 is adapted to be connected at its inlet end to a source of pressurized water, such source may be either carbonated or flat water and should have a pressure of at least 7 PSIG. If the pressure of the water source is excessively high, a pressure regulator may be installed in the line which is a well-known practice. There is a normally closed valve 18 in the water line 12 which is opened to allow flow of water and closed to stop flow; valve 18 thereby controls operation of the dispenser 10. The water line 12 continues past the valve 18 to the mixing head 11. There is a partially obstructed opening 19 in the water line 12 downstream of the water valve 18. In the embodiment shown, the obstructed opening 19 is formed by an adjusting screw 20 which enables adjustment of the size or cross section of the partially obstructed opening 19. Between the water valve 18 and the partially obstructed opening 19 there is a length of the water line 12 which forms a bypass chamber 21 and into which flowing water is backed up by the obstructed opening 19. There is a bypass outlet 22 from chamber 21 connnected to the bypass line 16 for purposes to be later explained.

Concentrate reservoir 13 is for holding a supply of beverage concentrate. Below reservoir 13 there is a metering chamber 14 which in the beverage art is many times also referred to as *a concentrate or syrup pump*. Reservoir 13 is fluidly connected to metering chamber 14 through a check valve 23 which is shown as having a simple rubber flapper, and is positioned to allow free flow of concentrate from reservoir 13 to metering chamber 14 and to preclude flow from metering chamber 14 to reservoir 13. Flow of concentrate through check valve 23 is by force of gravity upon the concentrate. There is a concentrate outlet line 24 from metering chamber 14 to the mixing head 11. The concentrate line 24 has a valve 25 for controlling flow of concentrate in line 24. The concentrate valve 25 must control concentrate flow so that concentrate cannot go backwards in the line 24 and fill line 24 with air. The valve 25 can be a normally closed valve which is operatively connected to work with the water valve 18 or can be a check valve which allows outwardly directed flow only. There may be an adjustable concentrate flow rate control 26 in line 24 which can be either upstream or downstream of the concentrate valve 25. In the embodiment shown, concentrate flow rate control 26 is adjustable.

The metering chamber 14 is divided or separated into two parts by the diaphragm 15 for physically separating concentrate and bypass water as will be explained. The diaphragm 15 is mounted to and retained in place by a removable cover 27 fastened to the outer case 28 of the metering chamber 14. The cover 27 has a round tubular section 29 extending into the metering chamber 14 and upon which the diaphragm 15 is secured by a stretched O-ring 30. The diaphragm 15 is of an elastically stretchable elastomer such as latex and is formed as an elongate cylinder. As an example, an excellent diaphragm 15 is made by a cylindrical rubber balloon. This diaphragm 15 when expanded is elastically stretched and biases itself from the expanded configuration toward its normal configuration with a force or pressure of about 1.2 PSIG.

The diaphragm 15 has a normal unstressed configuration which is cylindrical as is shown in solid line. Under the pressure of concentrate flowing by gravity from the reservoir 13 into the metering chamber 14, the diaphragm 15 completely collapses into the alternative configuration shown in dotted line as 15*c*. When the diaphragm 15 is blown up under pressure of bypass for *pumping* concentrate as will be later explained, it will expand to a shape indicated in dotted line by 15*e* which almost completely fills the metering chamber 14. The concentrate outlet line 24 has a screen 31 which prevents the diaphragm 15 from extruding out the concentrate line 24. It has been found that the metering chamber 14 works well when sized to have a volume of approximately 200 cc; this gives a pumping capacity of about 190 cc of concentrate per cycle. It has been found that the diaphragm 15 is completely expanded by an internal pressure of 1.5 PSIG and that the entire 190 cc is pumpable by that pressure.

In order to pressurize the interior of the diaphragm 15, the bypass line 16 is connected from the water line 12 to the metering chamber 14. The bypass line 16 is fluidly connected to the water line 12 at the bypass outlet 22 of bypass chamber 21. An adjustable bypass flow control 32 is provided for enabling adjustment of the amount of water flowing into and through bypass line 16. The bypass line 16 is fluidly connected at its other end to one side of the diaphragm 15 by metering chamber cover 27 which has an internal port having a diaphragm inlet 34 in fluid connection with the interior of the diaphragm 15.

A very important feature of the present invention is the provision of the bypass water drain 17 in the bypass line 16. Although the drain 17 is shown as being in the cover 27, the entirety of the fluid passageway from the water line 12 to the diaphragm 15 is considered as the bypass line 16 and the drain 17 may be anywhere between a check valve 35 and the diaphragm inlet 34. The metering chamber cover 27 is made of a rigid plastic and has means for holding the diaphragm 15 as previously explained, and for economy of fabrication and simplicity has both the drain 17 and the diaphragm inlet 34, which connects the bypass line 16 to the diaphragm 15, located immediately adjacent to one another as is shown. The entire bypass line 16 is relatively unrestricted to the rate of normal water flow therethrough save for adjustable flow control 32 which if for precisely restricting and controlling flow into line 16, and the drain 17 is sized to have a greater restriction to water flow than any restriction in the bypass line 16.

An important feature of the invention is the relative sizing of the drain 17. The drain 17 is an open aperture of fixed size. The cross section of the drain 17 is sized to retain water by surface tension or capillary action so that once the bypass line is priced, it retains its prime between dispensing cycles. It has been found that a preferred drain 17 sizing is a 0.052 inch diameter by ¼ inch long aperture. The drain 17 sizing preferably has an area equivalent to the area of a diameter in the range of 1 to 2 mm and it has been found that this area provides for retention of a prime of bypass water in the bypass line 16 during the period of non-use of the dispenser 10 and during which period the bypass line 16 is not pressurized. Another and an important feature of the drain 17 is that it be sized to form the greatest restriction to flow of bypass water either through or from the bypass line 16.

There is a bypass check valve 35 fluidly mounted in the bypass line 16. The bypass check valve 35 is mounted between the water line 12 and the drain 17 and is operative to allow flow of bypass water from line 12 to the metering chamber 14 and to preclude water flow from the metering chamber 14 to water line 12. The bypass check valve 35 is shown as being an extremely economical type of valve commonly known as a "thomas" valve and is shown installed in the metering chamber cover 27.

It will be noted that an adjustable water flow control 36 may be placed in water line 12, and that the water valve 18 and the concentrate valve 25 may be operatively connected for simultaneous or sequential operation as a particular beverage may require.

The dispenser 10 has a conventional waste outlet or drain 37 which gathers waste or slopped beverage from the mixing head 11 and bypass water from the drain 17 and routes it for disposal.

In operation of the dispenser 10, the water line 12 is connected to a source of pressurized water which may be regular tap water, carbonated water or any other aqueous diluent. A beverage concentrate or syrup is placed within the reservoir 13. A typical soft drink concentrate is concentrated 5 to 1 or it requires 5 parts water be blended to 1 part of concentrate to form a finished drink. Fruit or vegetable juice concentrates are usually less concentrated and are reconstituted at a ratio of 2.5 or 3.0 to 1. Other concentrates such as tea or coffee may require 6 or more parts of water for proper blending. It is a feature of the present dispenser 10 to be able to accommodate these many different concentrates or syrups.

As the reservoir 13 is being initially filled, concentrate flows under the force of gravity through the check valve 23 into the metering chamber 14 and collapses the diaphragm 15 to the configuration shown in dotted line **15*c* and concentrate fills the metering chamber 14**.

The first or initial opening of water valve 18 primes the bypass line 16 and the concentrate oulet line 24. As the water valve 18 is opened, water flows through line 12, past flow control 36, through valve 18, into the bypass chamber 21 and then through the partially obstructed outlet 19 and then out the mixing head 11 and into either the cup or the waste outlet 37.

When the flowing water begins to flow through the partially obstructed opening 19, the pressure which the water is under from the pressure source is partially backed up and developed at least in part in the bypass chamber 21 as a bypass pressure. Some of the water in the bypass chamber 21 is then directed or forced by the bypass pressure through the bypass outlet 22 into bypass line 16, through the check valve 35 and against the diaphragm 15. This portion of water from line 12 which is directed through the bypass line 16 is hereinafter called the bypass water. As the bypass line 16 is primed, all air in the line is driven out of the drain 17. When the bypass water reaches and makes contact with the diaphragm 15, its flow is resisted by the concentrate in the metering chamber 14 and the bypass pressure begins to build up in the bypass line 16 and inside of or against one side of the diaphragm 15. As the bypass pressure builds up, bypass water begins to flow out of the drain 17 but due to the predetermined restrictive size of the drain 17, the bypass pressure is maintained within the bypass line 16 and against the diaphragm 15.

The bypass pressure continues to force bypass water into bypass line 16 and against the diaphragm 15 which initially is in the collapsed configuration of **15*c* and the diaphragm 15 begins to expand from the collapsed configuration of 15*c* to the normal configuration of 15 and then to the expanded configuration 15*e* as will be later explained. As the diaphragm 15 is expanded by bypass water, the bypass pressure is transferred through the diaphragm 15 to the concentrate in the metering chamber 14. The check valve 23 prevents concentrate flow back into the reservoir 13 whereupon the concentrate is forced from the metering chamber 14 into and through the concentrate outlet line 24, past flow control 26 and valve 25 to the mixing head 11**.

After the dispenser 10 is primed and both water and syrup are flowing from the mixing head 11, the ratio of water to concentrate must be adjusted to obtain the desired and proper beverage. In order to do the adjusting, the water and syrup flows are divided before mixing and the correct water flow is approximated. As an example, if the total dispensing rate is to be 60 cc per second and the ratio is to be 5 parts water to 1 part concentrate, a water flow rate of 50 cc per second is needed. Firstly, the adjustable partially obstructed opening 19 is opened to its maximum size and then the water flow control 36 or else a water pressure regulator (not shown) is adjusted to give a water flow rate coming from the mixing head in excess of the total drink rate, for example, a flow rate of 65 cc or greater. The partially obstructed opening 19 is then reduced in size to give the desired flow rate of water, i.e., 50 cc per second which restricts the flow of water and backs up at least part of the water supply pressure forming the bypass pressure in bypass chamber 21.

The concentrate flow control 26 may be set at approximately its halfway setting between minimum and maximum flow rates and the bypass flow control 32 is then adjusted to give a flow of bypass water against the diaphragm 15 which will displace concentrate and propel it out of the mixing head 11 at the approximate desired rate, i.e., 10 cc per second. The partially obstructed outlet 19 and adjusting screw 20 can then be finely reset to give the precise 50 cc per second water flow and the concentrate flow control 26 can then be set to finely control the concentrate flow rate at a precise 10 cc per second.

After the dispenser 10 is primed, a prime of bypass water is retained within the bypass line 16 by the drain 17 which is sized for allowing the bypass water, which has previously displaced the concentrate, to drain as will be described but also to retain a prime of bypass water by capillary action or surface tension in the relatively small bore of the drain 17. A prime of concentrate is retained in the concentrate line 24 by the valve 25 which controls concentrate flow so that concentrate cannot flow backwards in the line 24. After priming, the metering chamber 14 is refilled with concentrate by flow under the force of gravity and the diaphragm 15 collapsed to the configuration of **15*e* and the bypass water which previously displaced and propelled the concentrate is drained out of the drain 17** as will be later explained.

The dispenser 10 is then ready for a regular dispensing cycle during which the operation is as follows. Dispensing of a drink is started by opening the water valve 18 and concentrate valve 25 if it is cooperative with water valve 18. Water under source pressure begins to immediately flow through line 12 and the partially obstructed outlet 19 builds up the bypass pressure in bypass chamber 21 which forces bypass water through the past bypass flow control 32, into bypass line 16 through check valve 35, and against the collapsed diaphragm **15*c***.

The bypass line 16 was previously primed so the concentrate in metering chamber 14 is immediately displaced by the incoming bypass water and forced out the concentrate outlet line 24 to the mixing head 11. As the bypass water begins flowing under bypass pressure into the diaphragm 15, the diaphragm 15 begins to expand from the collapsed configuration of 15*c* toward the configuration 15. During this expansion, the diaphragm 15 creates absolutely no resistive pressure against the incoming bypass water but during further expansion of the diaphragm from the configuration of 15 to 15*e* a resistive pressure of about 1.2 PSI is made by the diaphragm 15. When the diaphragm 15 is fully expanded to the configuration of 15*e*, the screen 31 prevents the expanded diaphragm from extruding into the concentrate outlet line 24.

The normal dispensing cycle is completed before the diaphragm 15 completely expands to the configuration 15*e*. For example, a normal cup of beverage may hold approximately 300 cc which would require from 200 to 270 cc of water and from 30 to 100 cc of concentrate over a blending ratio range of from 3:1 to 9:1. The metering chamber, as previously stated, is sized at about 200 cc volume if the dispenser 10 is intended to fill one cup at a time and only part of the chamber volume is used.

When the water valve 18 is closed, flow of both water and concentrate stops immediately and concurrently because of the almost immediate dropping or loss of the bypass pressure. During the dispensing flow of bypass water and concentrate, the drain 17 is always open and a minimal quantity of bypass water is wasted as will be described. The bypass water flows into and through bypass line 16 and through check valve 35 and internal port 33 and inlet 34 to the diaphragm 15. The bypass pressure is simulataneously applied to the diaphragm 15 and the drain 17 and a certain quantity of bypass water will be wasted out of the drain 17. The drain 17 is sized, as was previously explained, to restrict flow of bypass water therethrough during dispensing so that the bypass pressure needed to displace the concentrate is not lost out the drain 17. It will be appreciated that by minimizing the bypass pressure a minimum of water will be wasted through drain 17, and to that end, adjustable controls 20, 26, 32 and 36 are provided. The drain 17 is sized to restrict the waste water flow rate to a lesser rate than the rate of flow of concentrate during dispensing. As an example, when the bypass pressure and water are driving concentrate out of metering chamber 14, anywhere from an additional 1/10 to ½ quantity of water may be passed by the drain 17. Specifically, in the propelling of 50 cc of concentrate from the metering chamber 14, an additional 5 to 25 cc of water may be needed for waste provision. This explains why the water flow control 36 is set to a flow rate greater than the total desired flow rate out of the mixing head 11. The flow of waste bypass water out of drain 17 is routed into the waste outlet 37 for disposal.

When the water valve 18 is closed and a dispensing cycle is terminated, the bypass pressure immediately drops and the flow of bypass water into line 16 ceases. The check valve 35 closes preventing backflow of bypass water up the bypass line 16 and dribbling from the mixing head 11.

It will be apparent that the metering chamber 14 must now be recharged with concentrate. Concentrate valve 25 is closed, be it a check valve or an open-close valve co-functional with water valve 18. The concentrate in the reservoir 13, under force of gravity, opens the check valve 23 and begins to flow into and refill the metering chamber 14. During this refilling, the previously used bypass water is released through the drain 17, which to repeat is always open. The rate of refill is determined by the rate of flow of water out of drain 17. If the diaphragm 15 has been expanded past configuration 15, it will give a small pressure boost to drive waste water through the drain 17. Typically, the refilling of the metering chamber will take from 2 to 3 times as long as the dispensing time. The incoming concentrate, under force of gravity, will completely collapse the diaphragm 15 to the configuration of 15*c*. When the metering chamber 14 is refilled, flow of previously used bypass water through the drain 17 ceases but the small size of the drain 17 retains a prime of bypass water for the next dispensing cycle.

The diaphragm 15 is easily cleaned or replaced as it may be easily removed by removal of the cover 27 from the metering chamber 14 and removal of the retaining O-ring 30.

It will be appreciated from the foregoing that this dispenser 10 is of extremely simple construction and is virtually foolproof as it does not require complicated valving and the like. It is particularly well adapted for use in a home where the water line 12 is hooked to the house water supply.

If the dispenser 10 is to be used only with a specific concentrate and predetermined water supply pressure, it can be further simplified by removal of some of the adjustable flow control elements, but for purposes of illustration an adjustable dispenser 10 capable of dispensing virtually all types of beverages is shown and described.

Although various and minor modifications may be suggested by those versed in the art, it should be understood that I wish to embody within the scope of the patent warranted hereon, all such embodiments as reasonably and properly come within the scope of my contribution to the art.

I claim as my invention:

1. In apparatus for mixing and dispensing a beverage having a dispensing head for mixing of water and beverage concentrate;

a water line having one end for being connected to a supply of pressurized water, a valve for control of flow of water through the line, and a water pressure chamber downstream of the valve and having a partially obstructed outlet for developing pressure in the chamber during flow of water therethrough, said water pressure chamber outlet being in direct fluid communication with the dispensing head;

a reservoir for containing a supply of beverage concentrate; a concentrate pump in fluid communication with the reservoir, said pump being fillable with concentrate from the reservoir;

a valve between the reservoir and the pump for allowing concentrate flow from the reservoir to the pump and for preventing concentrate flow from the pump to the reservoir;

a concentrate line between the pump and the dispensing head, there being a valve in the concentrate line for controlling flow of concentrate therethrough;

a bypass line fluidly connecting the water pressure chamber to the pump for bypassing water from the water pressure chamber to the pump under the pressure formed by the flow of water through the partially obstructed outlet; and a diaphragm positioned in the pump for physically separating concentrate and water in the pump, the diaphragm beig distortable upon flow of and under the pressure of bypassed water flowing into the pump, for pressurizing the concentrate in the pump and forcing concentrate through the concentrate line from the pump to the dispensing head;

the improvement comprising:

(a) a water pressure actuatable automatic bypass water check valve fluidly connected in the bypass line between the water pressure chamber and the pump, said bypass line extending downwardly to a level below the level of said water pressure chamber with said bypass check valve being operative for automatically allowing a discrete flow of bypass water from the water pressure chamber to the pump under the pressure formed by the flow of water being dispensed through the partially obstructed outlet, and for automatically precluding any reverse flow if this discrete bypass water back to the water pressure chamber; and (b) an always open bypass water drain in the bypass line between the bypass check valve and the concentrate pump, said drain (1) being at a level below the level of the water pressure chamber outlet, (2) being in unobstructed fluid communication with both of the bypass check valve and the concentrate pump, and providing fluid communication between the pump and ambient, (3) being sized substantially smaller in cross section than the bypass line and forming a greater restriction to flow of water therethrough than any restriction to flow of water through the bypass line, (4) leading to a waste outlet, for operative draining of a. a minor portion of the flow of bypassed water during and concurrent with pumping of concentrate, and b. the major portion of the flow of bypassed water subsequent to concentrate pumping and during refill of the pump with concentrate, and (5) having the internal cross-sectioned area of a diameter in the range of 1 to 2 millimeters, for retaining by capillary action a prime of bypassed water within the bypass line and between the check valve and concentrate pump when and after said water line valve is closed;

whereby the improved apparatus does not drain the bypassed water out of the water pressure chamber outlet and on top of beverage formed of water and concentrate from the pump.

2. In a method of mixing and dispensing a beverage having the steps of:

(a) opening a water valve and passing a flow of water through a water line, from a pressurized source to a dispensing head;

(b) partially obstructing the flow of water and developing a bypass pressure downstream of the valve when the valve is opened;

(c) providing beverage concentrate in a concentrate pump;

(d) bypassing a discrete portion of the flow of water which is under the bypass pressure, from the water line and via a bypass line to the concentrate pump, and physically separating the bypassed water from the concentrate within the pump;

(e) transferring the bypass pressure through the bypassed water and against the concentrate in the pump, and pumping concentrate from the pump to the dispensing head with the bypass pressure by displacing the concentrate within the pump with bypassed water;

(f) mixing the flowing water at the dispensing head with the concentrate pumped to the dispensing head and dispensing the mixed water and concentrate as a drinkable mixed beverage; and (g) closing the water valve and simultaneously terminating flow of all water and concentrate to the dispensing head;

the improvement comprising the further steps of:

(1) draining a portion of the discrete bypassed water from the bypass line directly to a waste outlet during and simultaneously with the pumping of the concentrate, (2) restricting the volumetric rate during such draining to a rate of volumetric flow less than the volumetric rate of flow of concentrate being concurrently pumped to the dispensing head so that only a minor portion of the bypassed water is so drained simultaneously with pumping, (3) subsequently draining a remaining and majority portion of the bypass water previously used for pumping concentrate from the pump and not drained during pumping of concentrate from the pump, directly from the bypass line to a waste outlet after terminating dispensing and while simultaneously refilling the pump with concentrate, said first step of draining and said subsequent draining being a continuous single flow without interrruption therebetween, and, with none of the draining flow being dispensed into beverage previously dispensed, and (4) retaining a prime of bypassed water in the bypass line by capillary action within a drain from the bypass line after completion of the subsequent draining and refilling of the pump.

* * * * *